US012137863B2

(12) United States Patent
Horridge

(10) Patent No.: US 12,137,863 B2
(45) Date of Patent: Nov. 12, 2024

(54) SHOE OR BOOT SOLE CLEANING DEVICE AND SHOE OR BOOT SOLE CLEANING KIT COMPRISING THE SHOE OR BOOT SOLE CLEANING DEVICE

(71) Applicant: Aquablast Services Limited, Lancashire (GB)

(72) Inventor: Mark Horridge, Lancashire (GB)

(73) Assignee: Aquablast Services Limited, Lancashire (GB)

(*) Notice: Subject to any disclaimer, the term of this patent is extended or adjusted under 35 U.S.C. 154(b) by 248 days.

(21) Appl. No.: 17/740,467

(22) Filed: May 10, 2022

(65) Prior Publication Data

US 2022/0361728 A1 Nov. 17, 2022

(30) Foreign Application Priority Data

May 14, 2021 (GB) ..................................... 2106932

(51) Int. Cl.
*A47L 23/18* (2006.01)
*A47L 23/22* (2006.01)
*B08B 3/04* (2006.01)

(52) U.S. Cl.
CPC ............... *A47L 23/18* (2013.01); *A47L 23/22* (2013.01); *B08B 3/044* (2013.01); *B08B 3/045* (2013.01)

(58) Field of Classification Search
CPC .......... A47L 23/18; A47L 23/22; A47L 23/24; A47L 23/26; A47L 23/28; A47K 7/026; B08B 3/04; B08B 3/044; B08B 3/045; B08B 3/047; B08B 3/048
USPC ........................................................... 15/264
See application file for complete search history.

(56) References Cited

U.S. PATENT DOCUMENTS 1,486,284 A * 3/1924 Eiffe ....................... A47L 13/59 15/261
4,161,799 A * 7/1979 Sorrells ................... A47L 13/58 15/264
4,494,267 A * 1/1985 Fredley .................. B44D 3/125 15/1
4,872,235 A * 10/1989 Nielsen ..................... A61L 2/18 15/104.92
5,071,628 A * 12/1991 Alazet ....................... A61L 2/18 422/292

(Continued)

FOREIGN PATENT DOCUMENTS

CN 209568712 U 11/2019
JP H08531 A 1/1996

OTHER PUBLICATIONS

United Kingdom Search and Examination Report issued in GB2106932.3, dated Oct. 7, 2021, 6 pgs.

*Primary Examiner* — Randall E Chin
(74) *Attorney, Agent, or Firm* — Woodard, Emhardt, Henry, Reeves & Wagner, LLP

(57) ABSTRACT

There is provided a shoe sole cleaning device (10) comprising a lower tray (20) having a bottom wall (22) and one or more side walls (24) which define a first compartment (V1) for cleaning liquid, and an upper tray (30) having a bottom wall (32) and one or more side walls (34) which define a second compartment (V2) for pebbles or crushed stone. The upper tray (30) is shaped and dimensioned such that at least a part thereof is accommodated in the first compartment (V1) of the lower tray (20). The upper tray (30) includes one or more holes (36) communicate between the first and second compartments (V1, V2).

25 Claims, 17 Drawing Sheets

(56) References Cited

U.S. PATENT DOCUMENTS

| | | | | | |
|---|---|---|---|---|---|
| 5,988,190 | A * | 11/1999 | Borges | B08B 3/044 134/135 |
| 6,260,230 | B1 * | 7/2001 | Hunt | A47L 13/58 15/264 |
| 6,374,867 | B1 * | 4/2002 | Maiuro | A47J 47/18 141/2 |
| 6,560,815 | B1 * | 5/2003 | Brennan | A47L 13/58 15/264 |
| 7,178,675 | B2 * | 2/2007 | Votel | A47L 17/02 210/488 |
| 7,437,795 | B1 * | 10/2008 | Bez | A47L 13/59 15/264 |
| 10,172,509 | B1 * | 1/2019 | Ketron | B65D 25/28 |
| 2005/0086760 | A1 * | 4/2005 | Young | A47L 13/58 15/260 |
| 2019/0133414 | A1 | 5/2019 | Barnhill et al. | |

* cited by examiner

SHOE OR BOOT SOLE CLEANING DEVICE AND SHOE OR BOOT SOLE CLEANING KIT COMPRISING THE SHOE OR BOOT SOLE CLEANING DEVICE

TECHNICAL FIELD

The present invention relates, generally, to a shoe sole cleaning device and a shoe sole cleaning kit comprising the shoe sole cleaning device.

BACKGROUND

There are many situations in which it is important for the sole of a piece of footwear to be cleaned effectively, in a timely and cost efficient manner. For example, many building sites generate a large amount of dirt and detritus that may be carried on the soles of the footwear worn by the ground workers and office staff. There may be environmental reasons for limiting the spread of this detritus, such as due to contamination, or to ensure that the rest of the site and surrounding area is kept in a clean manner. There are many other situations such as stables, farms, dog kennels, café, hotels, exhibitions, sporting events, home use and mobile ground workers in which an apparatus is needed to clean the soles of varying footwear quickly and effectively, with ease.

Moreover, there are particular infections that can be spread in agricultural environments and to trees to name but a few and can significantly damage the health of forests. These infections (such as Kauri Dieback—*Phytophthora agathidicida* in New Zealand and in Cheshire UK *Phytophthora Ramorum*) can be carried on the soles of the footwear of hikers and the like. It is therefore essential that here exists an apparatus to enable the cleaning of the soles effectively of said footwear in a quick and efficient manner.

STATE OF THE ART

Shoe footwear sole cleaning devices for removal of debris such as soil, mud, clay, wet concrete, sewage, food wastes, chemicals and sand from the sole of a shoe have been known from the state of the art.

U.S. Pat. No. 4,425,477A discloses a shoe cleaner comprising a foramina scraper which is particularly a grate composed of a plurality of cubelet foramina. The cubelets provide an upper scraping surface across which the sole of shoe is moved to remove debris therefrom. With the flat scraping surface, debris, especially debris that enters the grooves of the sole, is hardly to remove. Further, the removed debris tends to clog the cubelet foramina in the scraping surface, resulting in more deteriorated removal and/or re-adhesion of debris onto the sole. Moreover, it is troublesome to remove the clogged debris from the foramina scraper after the use.

U.S. Pat. No. 4,866,805A discloses a shoe sole cleaner comprising a liquid containment tray. Cleaning liquid is stored within a lower portion of the tray. A shoe sole-engagement mat structure with bristles is partially immersed in the cleaning liquid. Although this arrangement may improve the removal of debris from the sole by invasion of the bristles into the grooves of the sole, the improved removal does not last for long because the bristles would permanently be buckled by the user's weight and mud may clog up in bristles Moreover, the production of the mat structure is comparatively complicated and thus expensive.

As such there at present does not exist an apparatus to enable the quick, effective and efficient cleaning of all sole types of footwear. There is a need for a device that can clean wellingtons, work boots, sport shoes, formal thin sole shoes for the office and even sandals with very little water used especially on the upper part of the footwear unless required. Moreover the use of reusable water, without a constant water supply, may allow the device to be used in mobile or fixed operation.

SUMMARY OF THE INVENTION

Aspects of the invention are set out in the independent claims. Optional features are set out in the dependent claims.

According to a first aspect of the present invention, there is provided a footwear cleaning device, comprising a lower tray having a bottom wall and one or more side walls which define a first compartment for cleaning liquid; and an upper tray having a bottom wall and one or more side walls which define a second compartment for cleaning aggregate, wherein the upper tray is shaped and dimensioned such that at least a part thereof is accommodated in the first compartment of the lower tray, and wherein the upper tray includes one or more holes communicate between the first and second compartments. This is advantageous as the apparatus is effective at removing detritus from the soles of footwear, and storing said detritus in the lower tray beneath the cleaning aggregate so as to avoid contamination.

Optionally, the device may comprise a third compartment for containing cleaning fluid, wherein the first and third fluid compartments are in fluid communication.

Optionally, wherein the third compartment is positioned within the lower tray.

Optionally, wherein a divider separates the first and third compartments such that fluid flows from the third compartment to the first compartment when water in the third compartment exceeds the depth of the divider, such that the third department is kept substantially free from detritus contained in the first compartment by said divider. It is stressed that the divider and third compartment are optional.

Optionally, the device may comprise a fluid inlet, optionally wherein the fluid inlet feeds fluid into the third compartment. This allows the first compartment to have its fluid level topped up when the fluid level is low.

Optionally, the device may comprise a fluid outlet to output fluid from the first compartment when the level of fluid within the first compartment is raised above the level of the fluid output. To maintain the desired fluid level, optionally a drain plug for draining/cleaning may be located below the ball valve.

Optionally, wherein the one or more holes are formed in the bottom wall of the upper tray.

Optionally, wherein the one or more holes are arranged in matrix.

Optionally, the device may comprise a supporting means for supporting the upper tray.

Optionally, wherein the supporting means includes one or more columns arranged between the bottom wall of the upper tray and the bottom wall of the lower tray, or alternatively wherein the supporting means comprises a ledge positioned in the lower tray.

Optionally, wherein the one or more columns, or the ledge, are formed integrally with the lower tray.

Optionally, wherein the supporting means includes one or more hook flanges which project outwardly from the one or more side walls of the upper tray so as to be hooked to upper edges of the one or more side walls of the lower tray.

Optionally, the device may comprise a wiping mat tray for receiving a wiping mat thereon.

Optionally, wherein the wiping mat tray is supported by one or more supporting ribs which project from inner surfaces of the one or more side walls of the lower tray.

Optionally, wherein the wiping mat tray is further supported by one or more supporting ribs which project from outer surfaces of the one or more side walls of the upper tray.

Optionally, the wiping mat tray including one or more holes communicating with the first compartment. Optionally, a pre scraping grate could be added to remove bulk mud.

Optionally, wherein the side walls of the lower tray form a rectangular cross-section.

Optionally, wherein the side walls of the upper tray form a rectangular cross-section.

Optionally, the device may comprise a lid element, wherein the lid element is configured to be removably coupled to the upper tray, and where the lid element and the coupling between the lid element and the upper tray are configured to be substantially impermeable to fluid.

According to a second aspect there is provided a footwear cleaning kit, comprising, a shoe sole cleaning device according to the first aspect and cleaning aggregate to be received in the first compartment of the shoe sole cleaning device.

Optionally, wherein the cleaning aggregate comprises pebbles or crushed stone, and optionally wherein the pebbles or crushed stone is made of limestone, granite or other hard stone/recycled media glass or similar.

Optionally, wherein the maximum diameter or width of the pebbles or crushed stone is 5.0 cm or less, preferably 4.0 cm or less, more preferably 3.0 cm or less. In some embodiments the crushed stone, such as limestone may be classified as 20 mm stone and may vary in size from 10 mm-25 mm approx.

According to a third aspect there is provided method of installing the shoe sole cleaning kit of the first aspect, the method comprising digging a trench with the approximate dimensions of the footwear cleaning device, positioning the footwear cleaning device within the trench such that the upper surface of the footwear cleaning device is approximately flush with ground level, filling the first compartment with cleaning fluid, and filling the second compartment with cleaning aggregate. The device may form part of a pedestrian footway.

According to a fourth aspect there is provided a method of using the footwear cleaning device of the first aspect, the method of use comprising the steps of positioning the sole of a piece of footwear in contact with the cleaning aggregate, moving the sole of the footwear such that the cleaning aggregate provides a frictional force against the sole of the footwear and in conjunction with the cleaning fluid acts to remove detritus from the sole of the footwear. The use of this method means that in the majority of circumstances he dirt will fall into the first compartment below.

According to a fifth aspect there is provided a method of manufacturing the cleaning device of any the first aspect, the method of manufacture comprising the steps of injection moulding the lower tray, and injection moulding the upper tray. Alternatively the device may be manufactured using construction from brick/precast concrete or metal

BRIEF DESCRIPTION OF DRAWINGS

The present invention will now be described by way of example with reference to the accompanying drawings, in which.

DETAILED DESCRIPTION

According to a first aspect of the present invention, there is provided a footwear cleaning device, comprising a lower tray having a bottom wall and one or more side walls which define a first compartment for cleaning liquid; and an upper tray having a bottom wall and one or more side walls which define a second compartment for cleaning aggregate, wherein the upper tray is shaped and dimensioned such that at least a part thereof is accommodated in the first compartment of the lower tray, and wherein the upper tray includes one or more holes communicate between the first and second compartments. This is particularly advantageous as it has been found that the detritus attached to the sole of footwear is substantially removed from the footwear during use, and is contained at the bottom of the lower tray, thus removing the risk of contamination.

Figure 1:
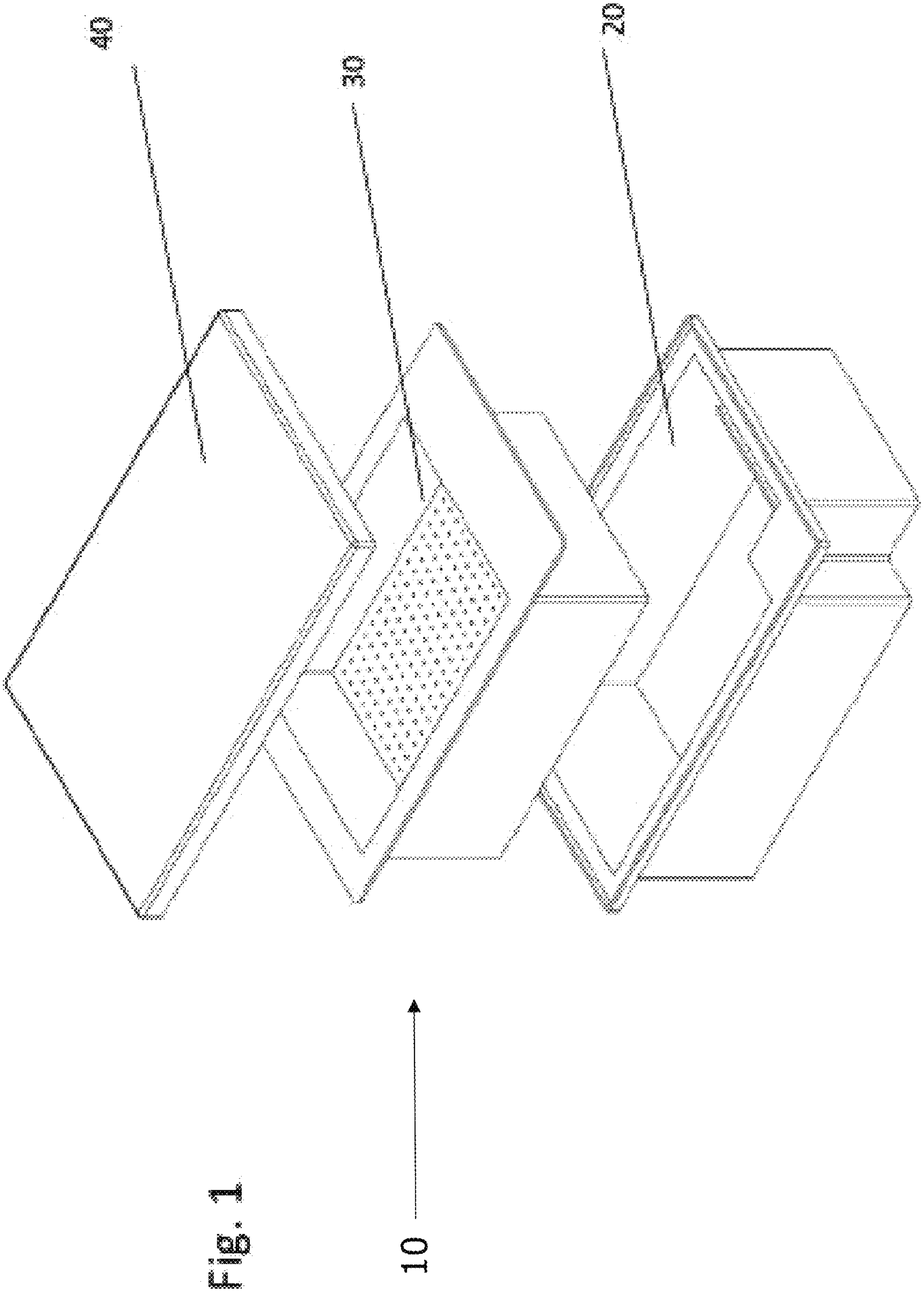
FIG. 1 is an exploded view of a first embodiment of a footwear cleaning device.

FIG. 1 is an exploded view of a first embodiment of a footwear cleaning device 10. The footwear cleaning device comprises a lower tray 20, an upper tray 30 and a lid element 40. The lower tray 20 is configured to be in the form a female element. The upper tray 30 is configured to be in the form of a male element. The upper tray 30 therefore fits within the lower tray 20. In particular, the second compartment V2 of the upper tray 30 may fit within the first compartment V1 of the lower tray 20. The lid element 40 may be removably coupled to the upper tray 30. Each element is described in more detail below.

Figure 2:
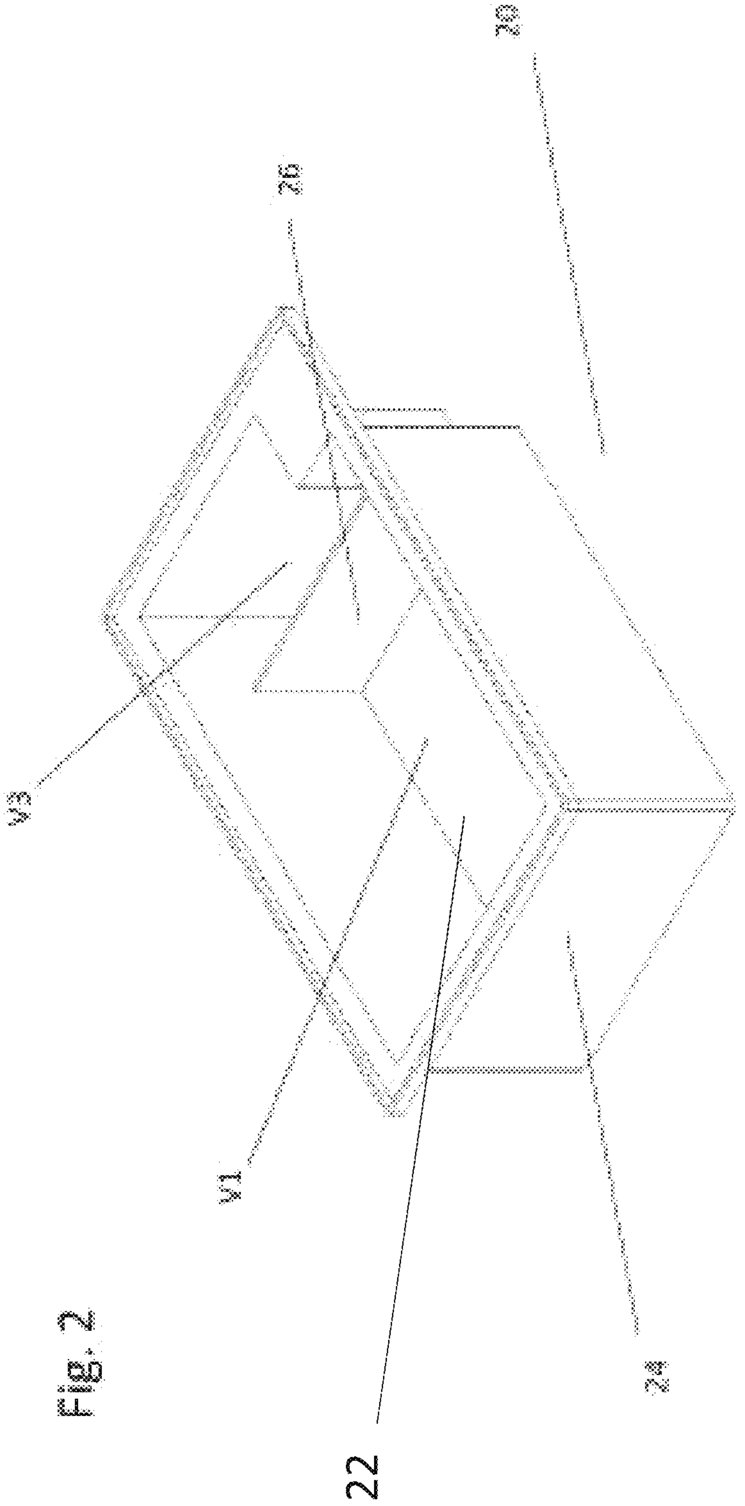
FIG. 2 is a perspective view of the lower tray in accordance with the first embodiment.

FIG. 2 is a perspective view of the lower tray 20 in accordance with the first embodiment. FIG. 2 shows that the lower tray 20 contains a volume. The volume within the tray is split by a divider 26. The divider 26 extends only partially in the vertical direction, such that it does not reach the top of the lower tray 20. The large portion of the enclosed volume comprises a first compartment V1. The smaller portion of the enclosed volume comprises a third compartment V3. The third compartment V3 is optional. The first compartment V1 is configured to hold cleaning fluid. The cleaning fluid may be any suitable fluid, such as water, or bleach etc. The third compartment is also configured to hold cleaning fluid.

The first compartment V1 and third compartment V3 are configured to be in fluid communication. The third compartment V3 is configured to act as a reservoir for the first compartment V1. For example, a fluid inlet may be positioned to allow fluid to enter the third compartment V3. Once the third compartment V3 is filled and fluid reaches the level of the divider 26 between the first compartment V1 and the third compartment V3 fluid then overflows over the divider 26 and enters the first compartment V1. Therefore, fluid can enter the first compartment V1 from the third compartment V3. This ensures that the third compartment V3 is kept substantially clean of debris and detritus from use of the device. This ensures that clean fluid enters the device 10.

This fluid communication may be implemented in a number of alternative ways. For example, a valve may be positioned between the first V1 and third V3 compartments. The valve may allow fluid to enter the first compartment V1 from the third compartment V3 when the level of fluid in the first compartment V1 is below a pre-set level. The valve may be implemented using a stop-cock type arrangement, or any other suitable valve. This may allow the divider 26 for example to be higher so that more fluid can be stored in the third compartment V3 and allow the third compartment V3 to top up the fluid level of the first compartment V1 as fluid evaporates due to evaporation.

The lower tray 20 is shown to have a substantially rectangular footprint. In this embodiment a cut-out is shown in one corner of the lower tray. This cut-out may be used to position a fluid overflow/outlet, and drain plug outlet for emptying and optionally the fluid inlet. For example, the fluid outlet may be used to ensure that fluid is not above a pre-set level in the lower tray 20. The cut-out is designed for ergonomic efficiency such that users do not knock or damage the fluid inlet or outlet.

Figure 3A:
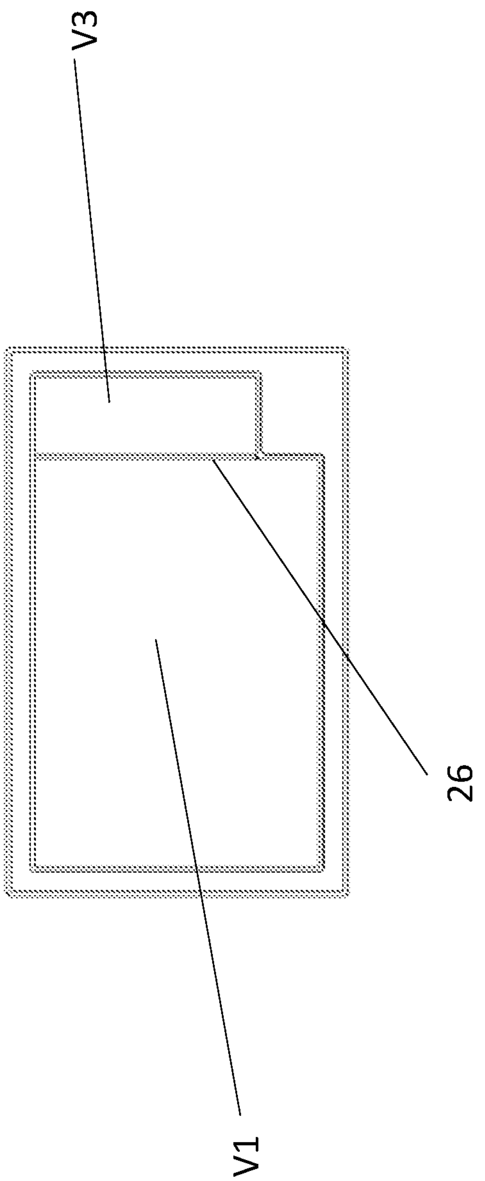
FIGS. 3*a* and 3*b* are cross sectional and birds eye views of the lower tray of FIG. 2.
Figure 3B:
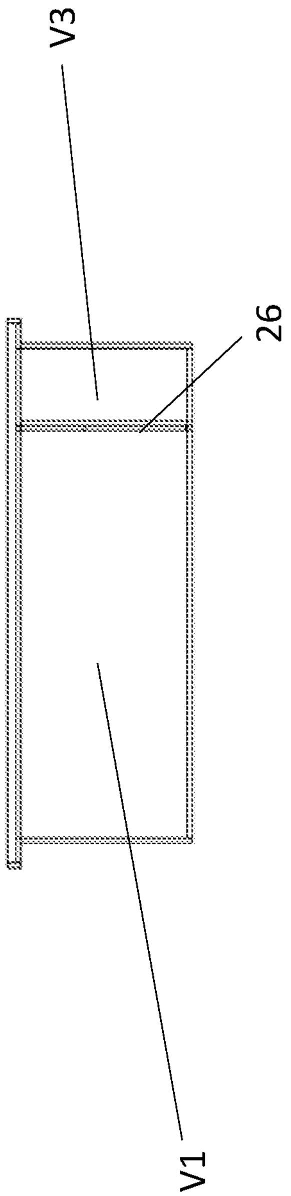

FIGS. 3*a* and 3*b* are cross sectional and birds eye views of the lower tray of FIG. 2. The birds eye view shown in FIG. 3*a*. This shows the rectangular footprint, the corner cut-out, the divider 26 between the first V1 and the third V3 compartments, the footprint of the first compartment V1 and the footprint of the third compartment V3. FIG. 3*b* shows a cross section of the lower tray 20 along the length of the lower tray. The divider 26 is shown, as are the first V1 and third V3 compartments.

Figure 4:
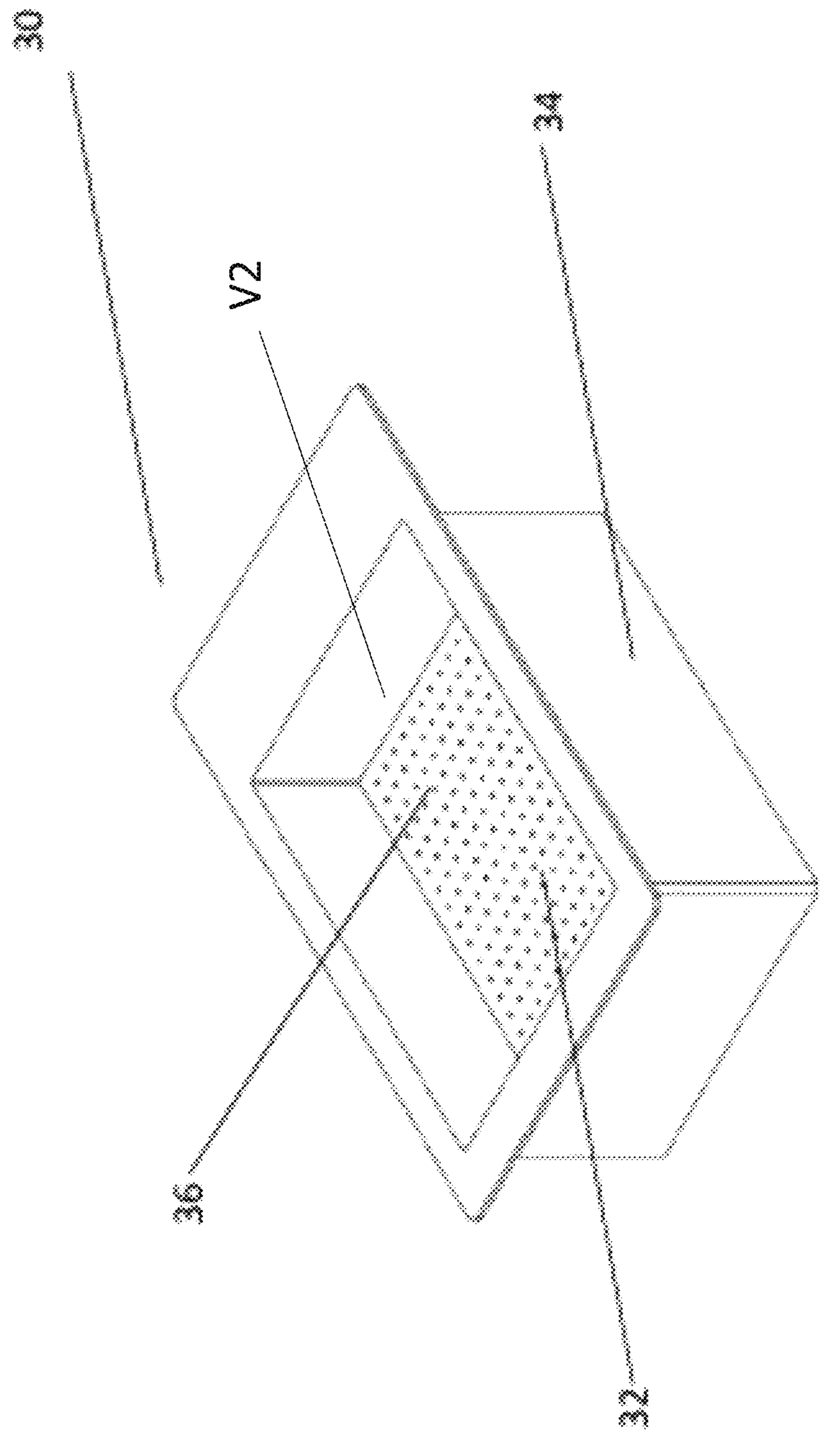
FIG. 4 is a perspective view of the upper tray in accordance the first embodiment.

FIG. 4 is a perspective view of the upper tray 30 in accordance the first embodiment. The upper tray 30 comprises a second compartment V2 with a bottom wall 32. The bottom wall 32 comprises a plurality of holes 36. The second compartment V2 of the upper tray 30 is configured to be housed within the first compartment V1 of the lower tray 20. The holes 36 enable the first compartment V1 and the second compartment V2 to be in bi-directional fluid communication. The holes 36 may be round or square or grooves in shape. The holes 36 may be in a regular matrix array, or may be placed in an irregular pattern. It is noted that the bottom wall 32 of the second compartment V2 is offset from the bottom of the upper tray 30. The side walls 34 extend down such that in use the side walls 34 of the upper tray 30 reach the bottom 22 of the lower tray 20. The position of the bottom wall 32 of the second compartment V2 in use may be approximately level with the top of the divider 26 of the lower tray 20. The second compartment V2 is configured to hold cleaning aggregate 60. The cleaning aggregate 60 may take the form of pebbles, or crushed rocks for example. In particular, limestone may be used.

Figure 5A:
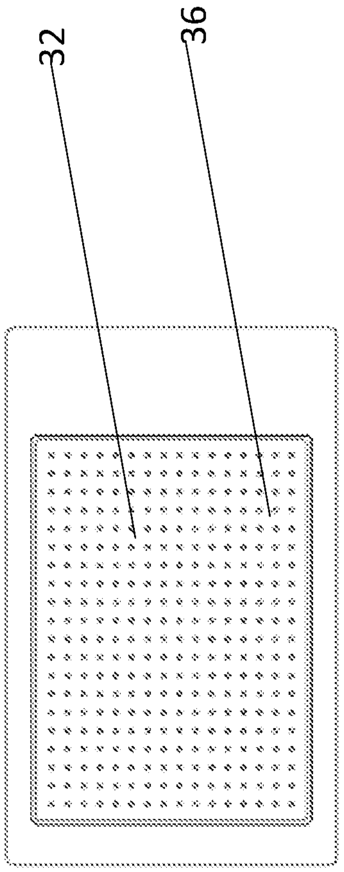
FIGS. 5*a* and 5*b* are cross sectional and birds eye views of the upper tray of FIG. 4.
Figure 5B:
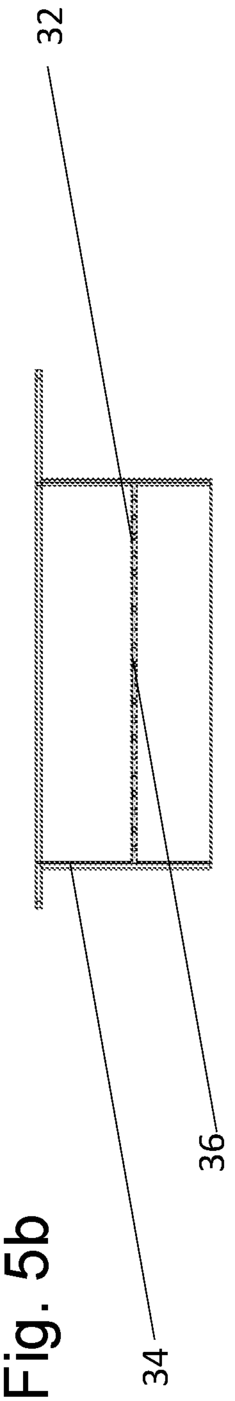

FIGS. 5*a* and 5*b* are cross sectional and birds eye views of the upper tray 30 of FIG. 4. FIG. 5*a* shows the birds eye-view of the upper tray 20 of FIG. 4. The bottom wall 32 and the holes 36 positioned on the bottom wall 32 are shown. Both the bottom wall 32, and the upper tray 30 as a whole have rectangular footprints. The cross sectional view of FIG. 5*b* is taken along the length of the device. This shows that the bottom wall 32 is offset from the bottom of the upper tray 30. The side walls 34 extend below the bottom wall 34 of the upper tray 30.

Figure 6A:
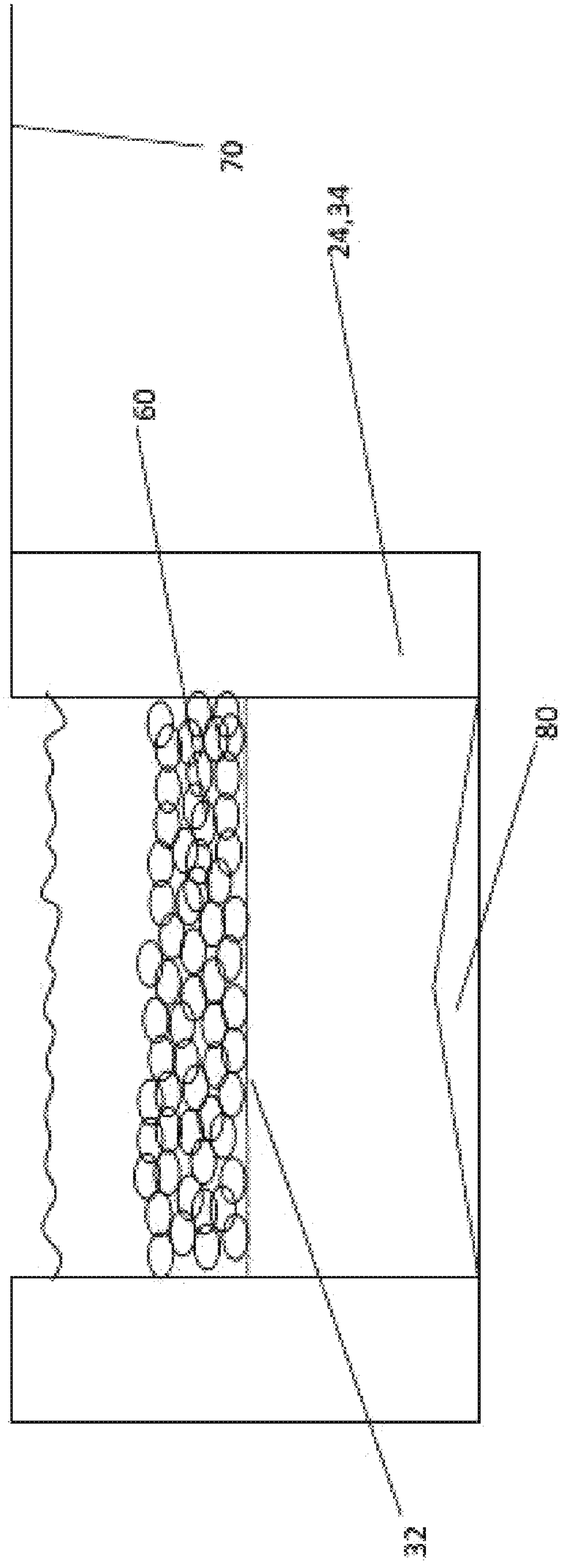
FIGS. 6*a* and 6*b* show cross sectional views of two variations of the first embodiment when assembled for use.
Figure 6B:
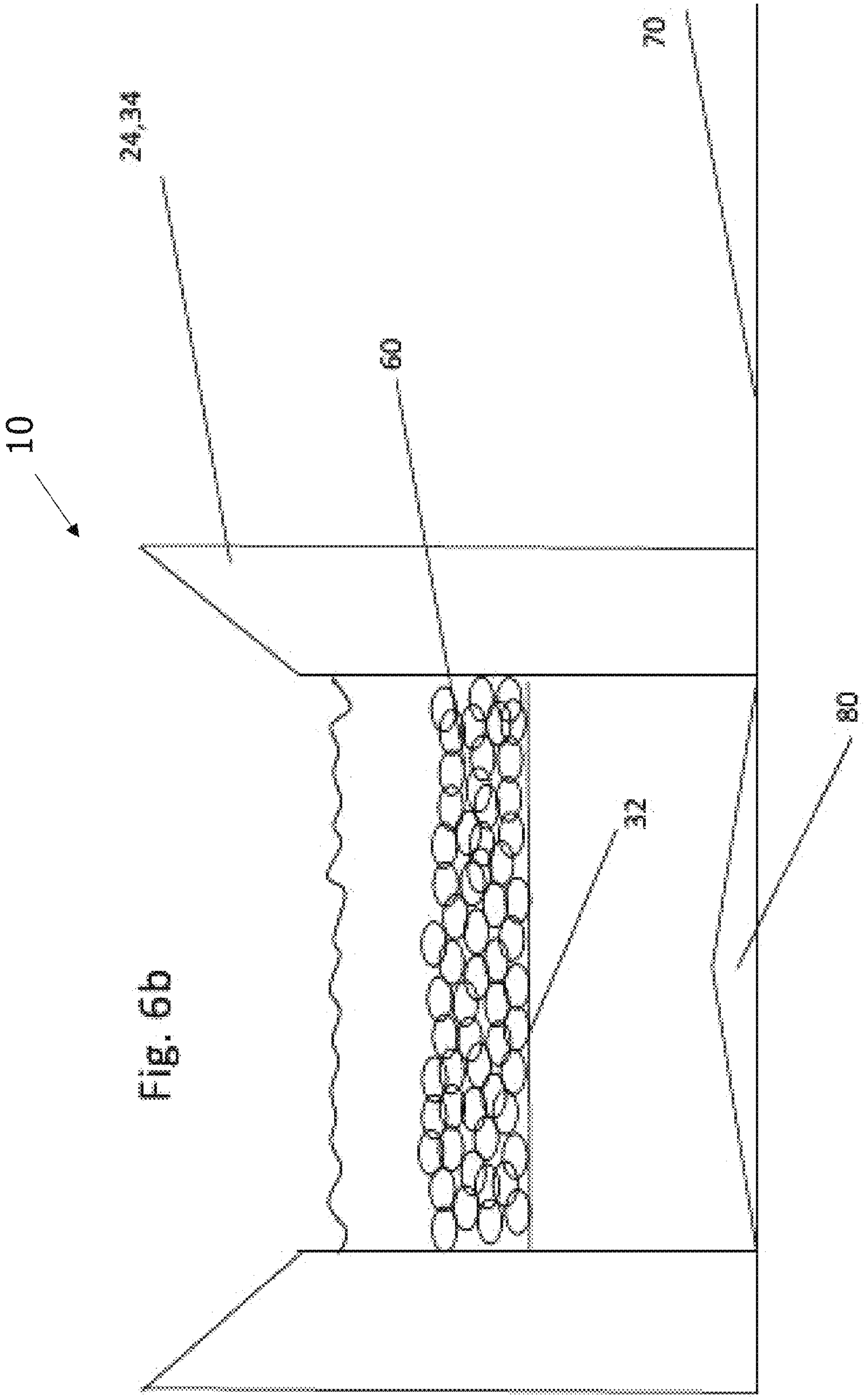

FIGS. 6*a* and 6*b* show cross sectional views of two variations of the first embodiment when assembled for use. FIG. 6*a* shows a variant in which the apparatus 10 is sunk into the ground. The top of the upper tray 30 is therefore flush with ground level 70. The side walls 24, 34 (comprising the side walls of both the upper and lower trays), the bottom wall 32 of the upper tray, the cleaning aggregate 60, the cleaning fluid, and the ground level 70 are all shown. Also shown is an amount of silt or detritus 80 resting at the bottom of the lower tray 20 as a result of use. The sunk configuration may be particularly advantageous as a permanent unit where multiple users may wish to use the device 10 at once. For example, at a building site many workers may wish to end work (for either for lunch or at the end of a working day to return home) at the same time. The sunken arrangement allows the user to simply walk through the apparatus 10 (either walking along the width or length of the apparatus) so that their feet are cleaned quickly and efficiently, and so reducing queuing for use of the device. Large apparatus may be produced allowing multiple users to use the device at one time and may also provide ease of maintenance during use This same advantage may be present at national parks suffering from diseases in the trees where visitors are required to clean their shoes before entering the park. The top of the sides of this configuration may be flat so as to enable ease of use.

This device may be installed by digging a trench with the approximate dimensions of the footwear cleaning device 10. The footwear cleaning device 10 may then be positioned within the trench such that the upper surface of the footwear cleaning device 10 is approximately flush with ground level 70. Alternatively, the device may be positioned such that it sits on top of the ground as a temporary unit. The sides may be raised to keep the stone in the cleaning zone. The device may then be configured for use by filling the first compartment V1 with cleaning fluid and filling the second compartment V2 with cleaning aggregate 60. A hand rail frame can be fitted or added for safety and balance. Optionally digital images may be taken of user's footwear post cleaning to confirm they meet a satisfactory standard.

FIG. 6*b* shows a configuration in which the apparatus 10 is raised above ground level 70, for example by the device sitting on the ground. The user must raise their foot to put it into the apparatus 10. The sides 24, 34 in this configuration may be raised so that spillage of the cleaning fluid and stone 60 is minimised during use. This configuration may be advantageous in mobile use (where the device may be moved from one location to another), or for domestic use. Through use the scraping of footwear on the cleaning aggregate 60 may otherwise lead to some of the cleaning aggregate 60 being expelled from the device 10. The raised sides address this problem. It is also noted that in this or any of the other embodiments described herein a vibrating element may be used to settle the stones into position such they reduce the volume they take up and therefore have an approximately even top surface.

Figure 7A:
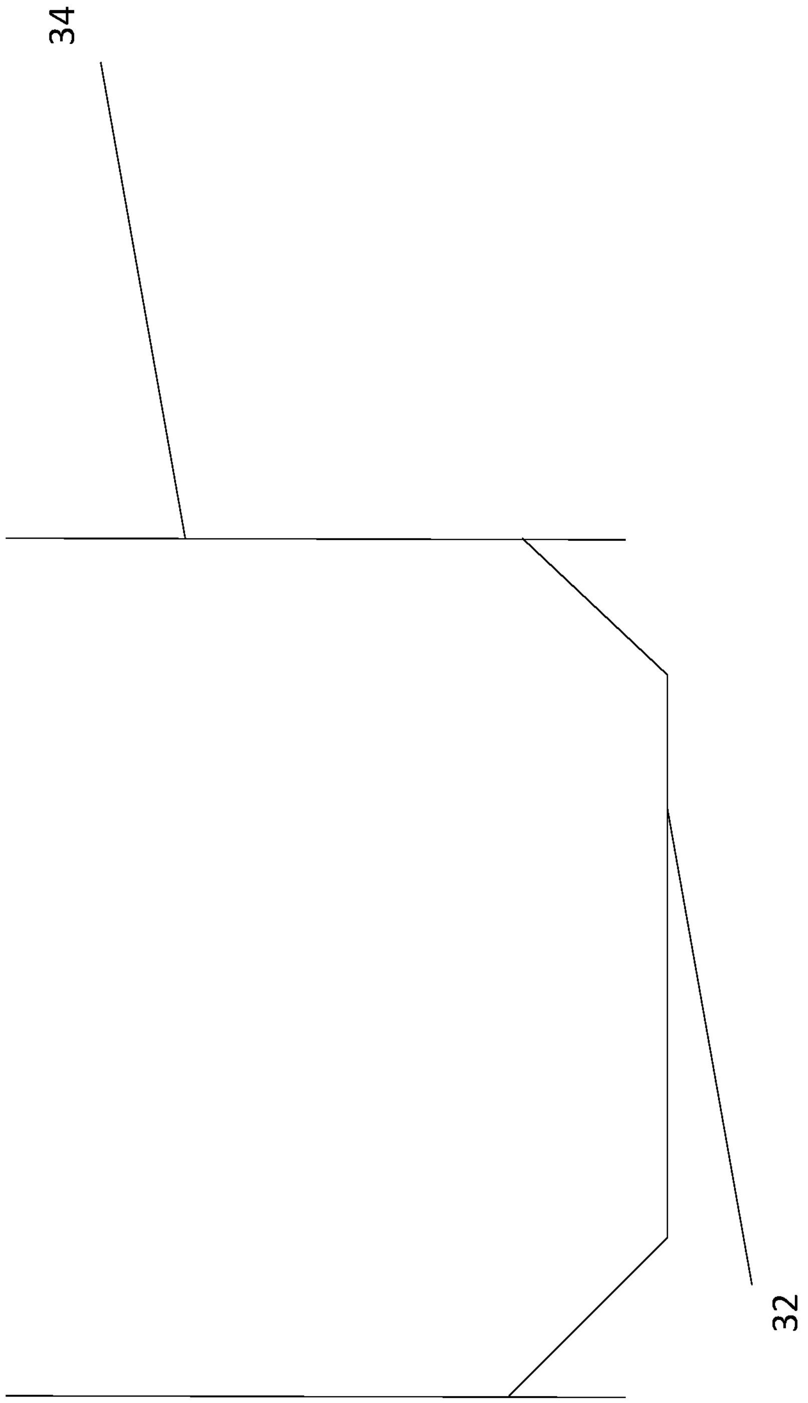
FIGS. 7*a*, 7*b*, 7*c*, 7*d*, 7*e* and 7*f* show cross sectional views of various embodiments of the upper tray, showing various shapes the bottom wall may take.
Figure 7B:
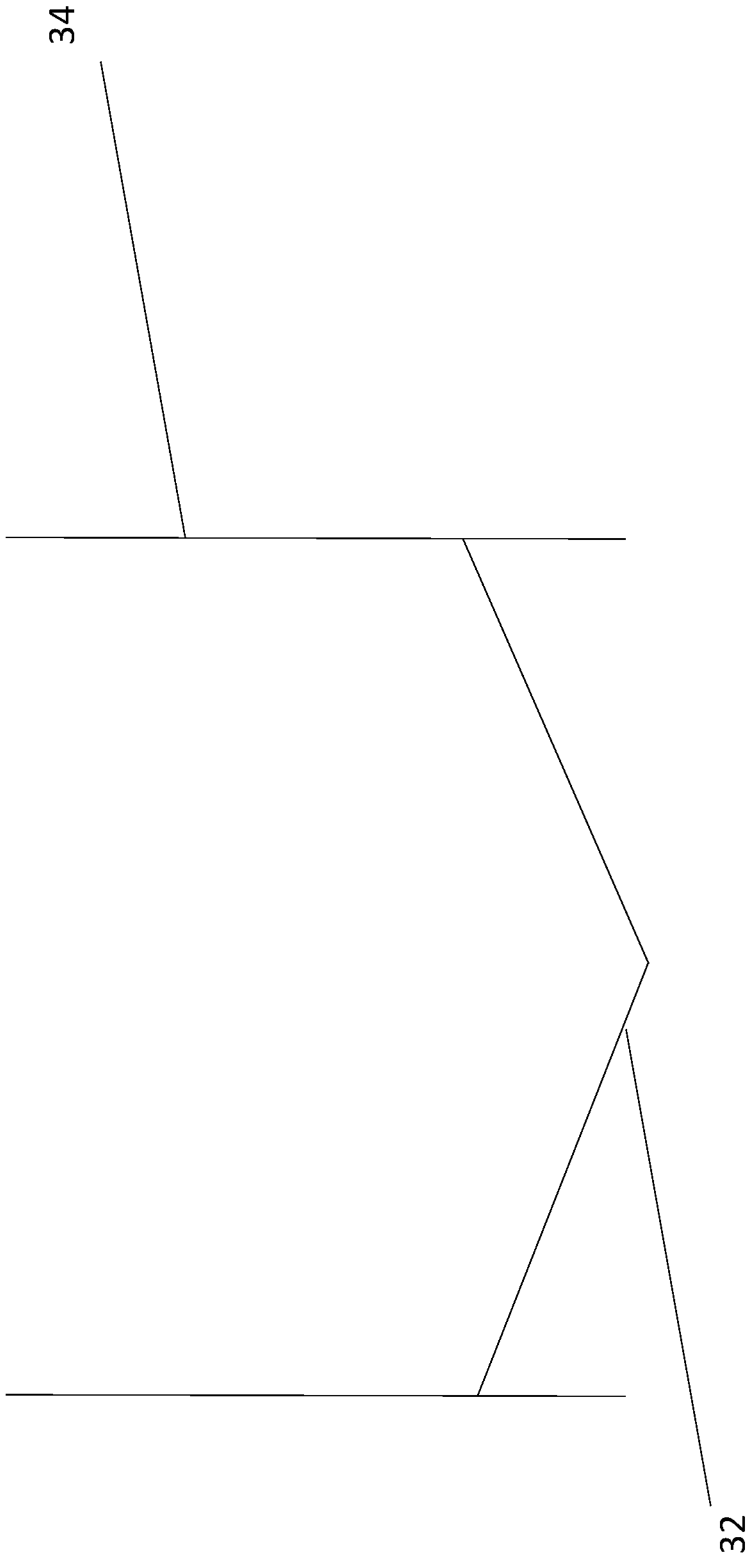
Figure 7C:
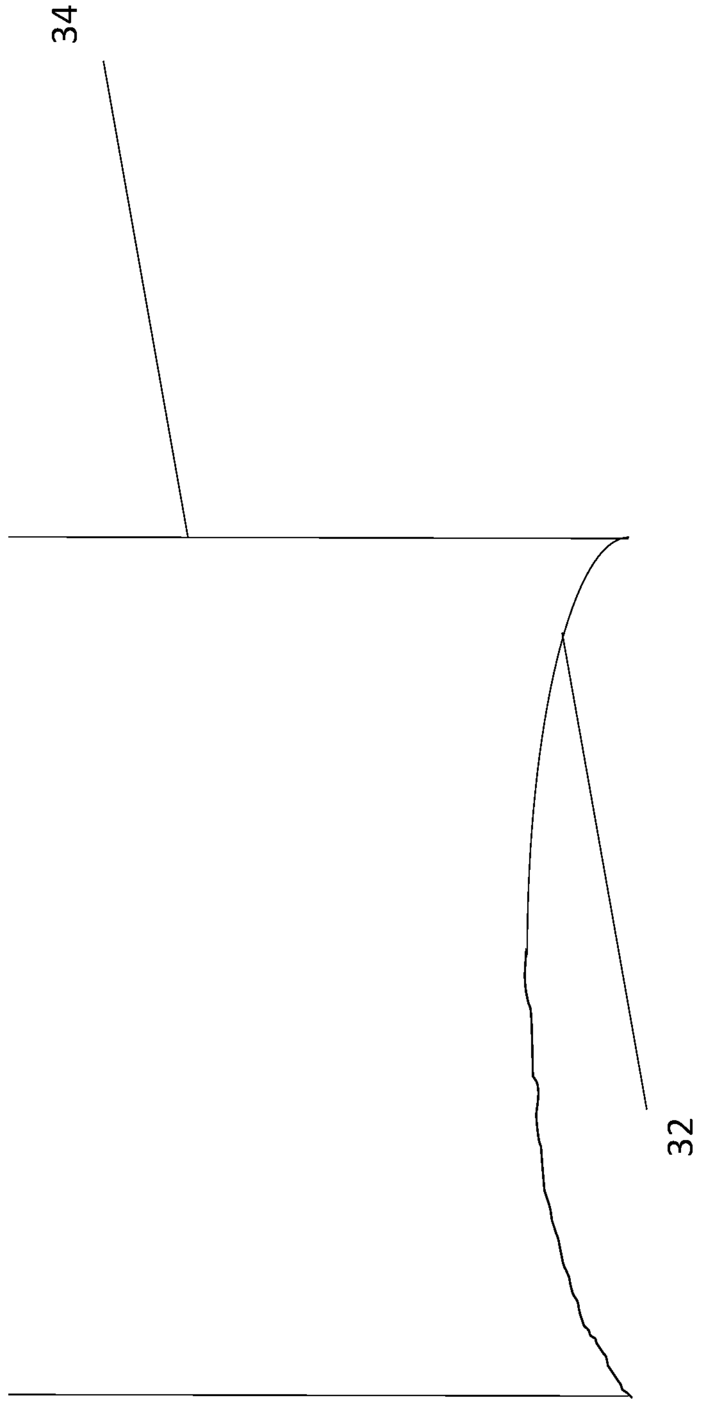
Figure 7D:
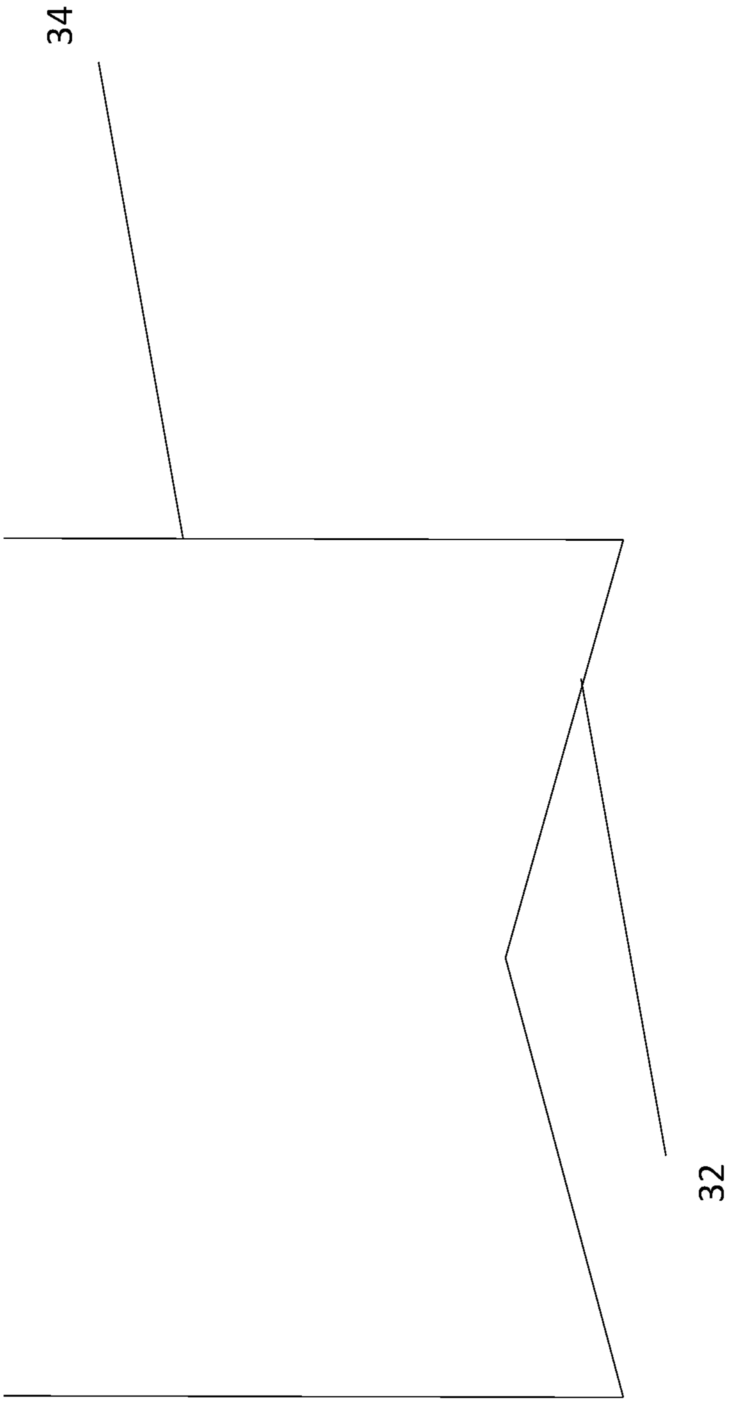
Figure 7E:
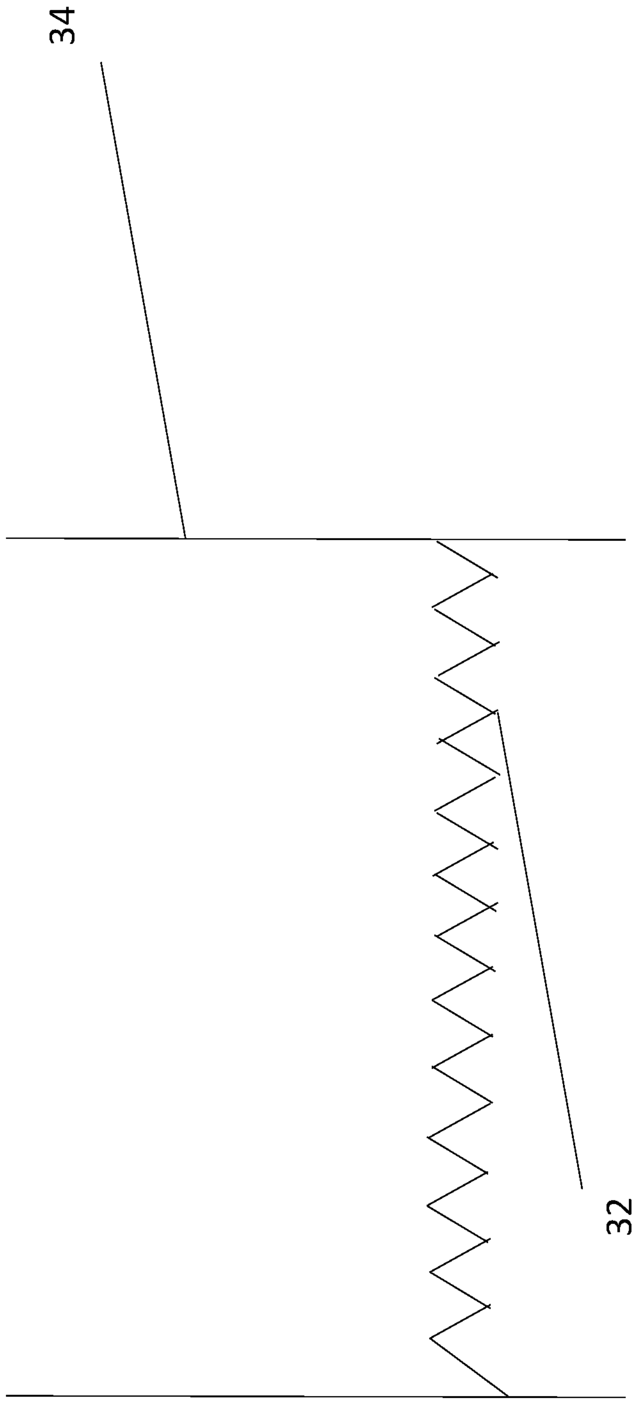
Figure 7F:
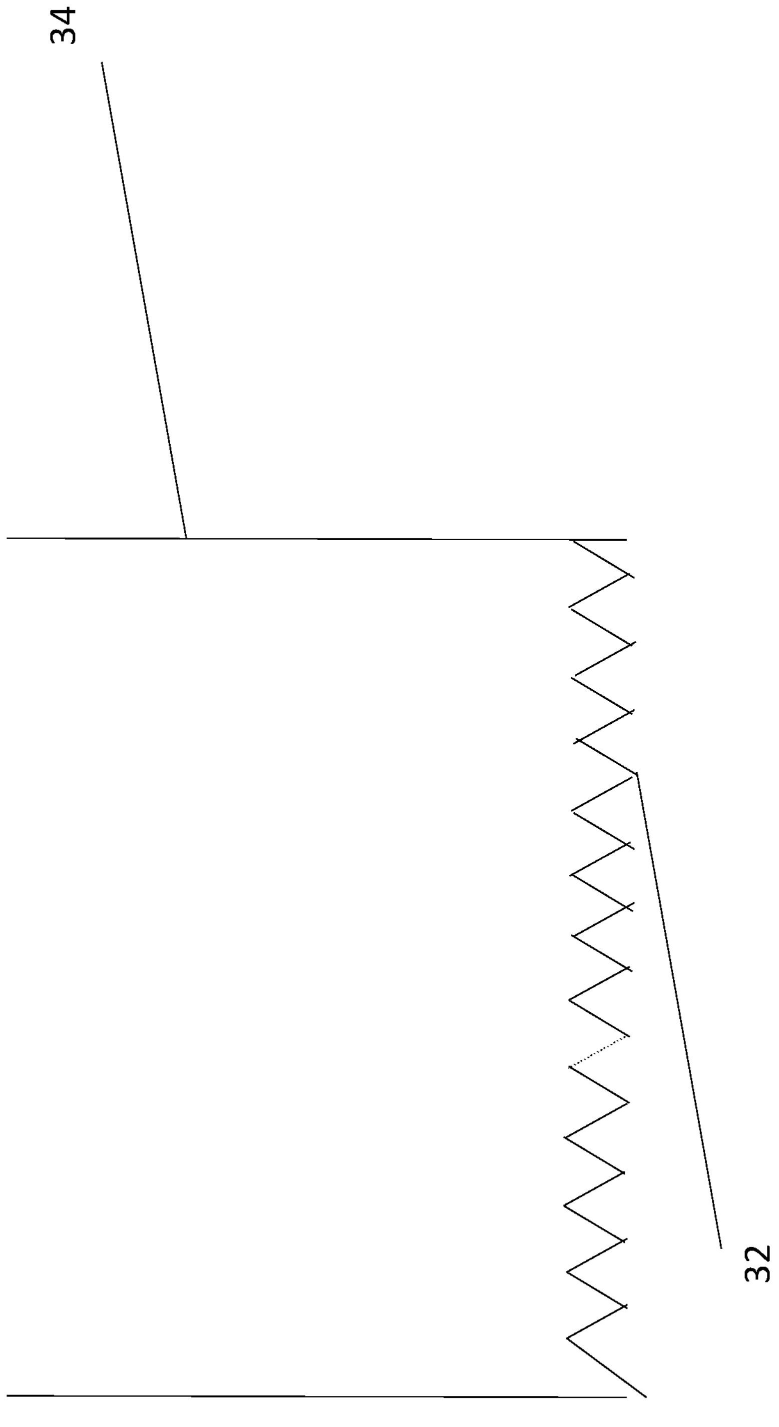

FIGS. 7*a, b, c, d, e* and *f* show cross sectional views of various embodiments of the upper tray 30, showing various shapes the bottom wall 32 may take. The holes 36 are provided in the bottom wall 32. It is noted that the bottom wall 32 includes any surface adjoining the bottom of the upper tray 30 to the side wall 34. FIG. 7*a* shows a bottom wall 32 comprising a flat base element and adjoining portions that connect the flat base portion to the side walls 34. All of these portions are considered to be part of the bottom wall 32. FIG. 7*b* shows two sloped surfaces emanating from the side walls 34 and meeting at the base of the bottom wall 32. The two sloped surfaces comprise the bottom wall 32 in this case. FIG. 7*c* shows a curved surface that rises from the side walls 34 to an inflection point in the middle. The entire curve is considered to form the bottom wall 32. FIG. 7*d* shows two sloped surfaces emanating from the side walls 34 and meeting at the peak of the bottom wall. The two sloped surfaces comprise the bottom wall 32 in this case. FIG. 7*e* shows a zig-zag pattern between the two side walls 34. The entire surface is considered the bottom wall 32. FIG. 7*f* shows the same zig-zag pattern but at the base of the sidewalls 34. Positioning the bottom wall 32 above the base of the sidewalls 34 is entirely optional.

The device described above may be used by positioning the sole of a piece of footwear in contact with the cleaning aggregate and then moving the sole of the footwear such that the cleaning aggregate provides a frictional force against the sole of the footwear and in conjunction with the cleaning fluid acts to remove detritus from the sole of the footwear. This method may be particularly advantageous for cleaning the footwear.

Figure 8:
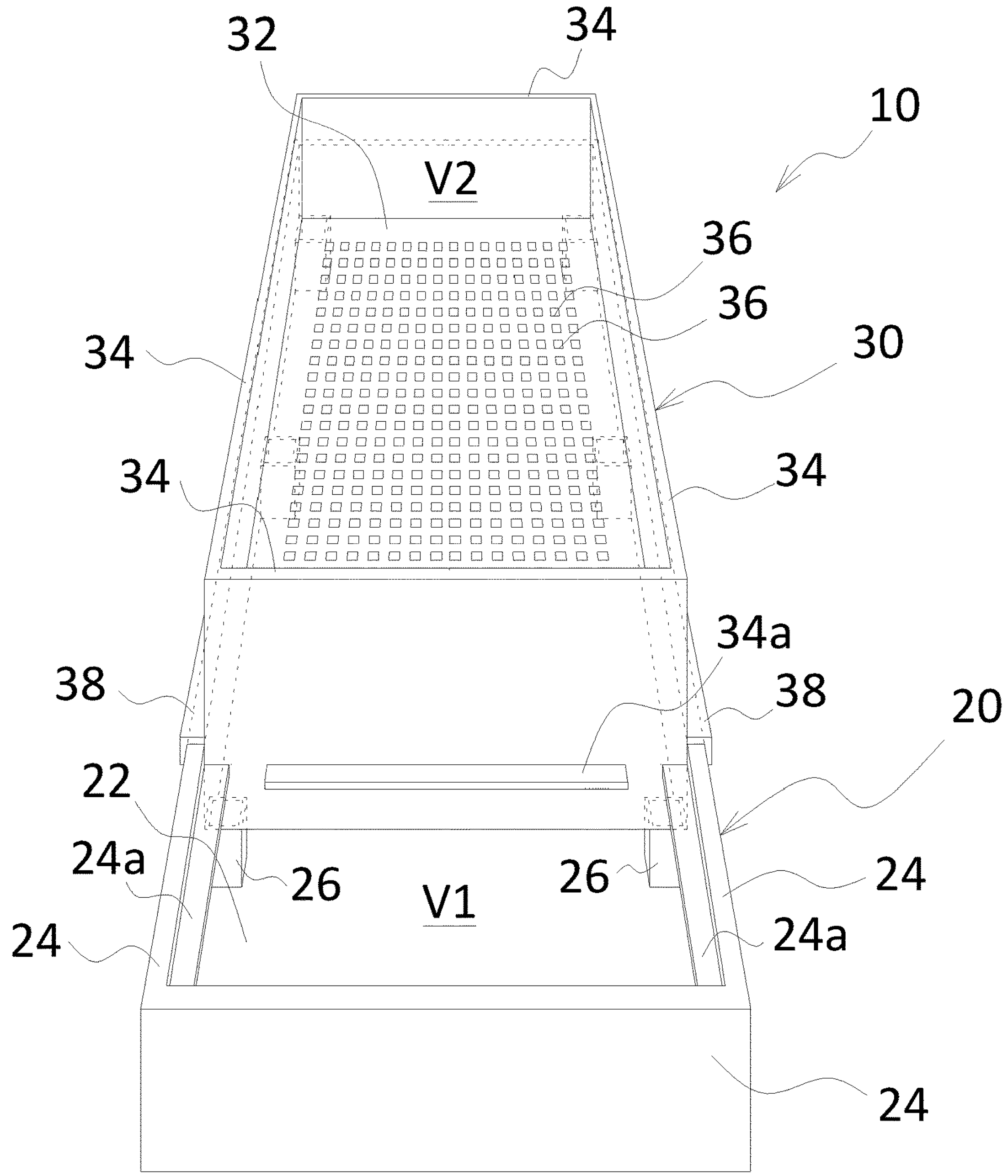
FIG. 8 is a perspective view of a second embodiment of a footwear cleaning device.

FIG. 8 shows a shoe sole cleaning device 10 comprising a lower tray 20 and an upper tray 30. The shoe sole cleaning device 10 may further comprise a wiping mat tray 40 (see FIG. 14). Each tray 20, 30, 40 may be made of plastic, particularly thermoplastic resin such as polypropylene, polyethylene, acrylonitrile-butadiene-styrene resin or polycarbonate resin, or fibre reinforced plastic such as carbon fibre reinforced plastic or glass fibre reinforced plastic. Alternatively, each tray 20, 30, 40 may be made of metal such as steel or aluminium. The device may be manufactured by injection moulding the lower tray and injection moulding the upper tray.

Figure 9:
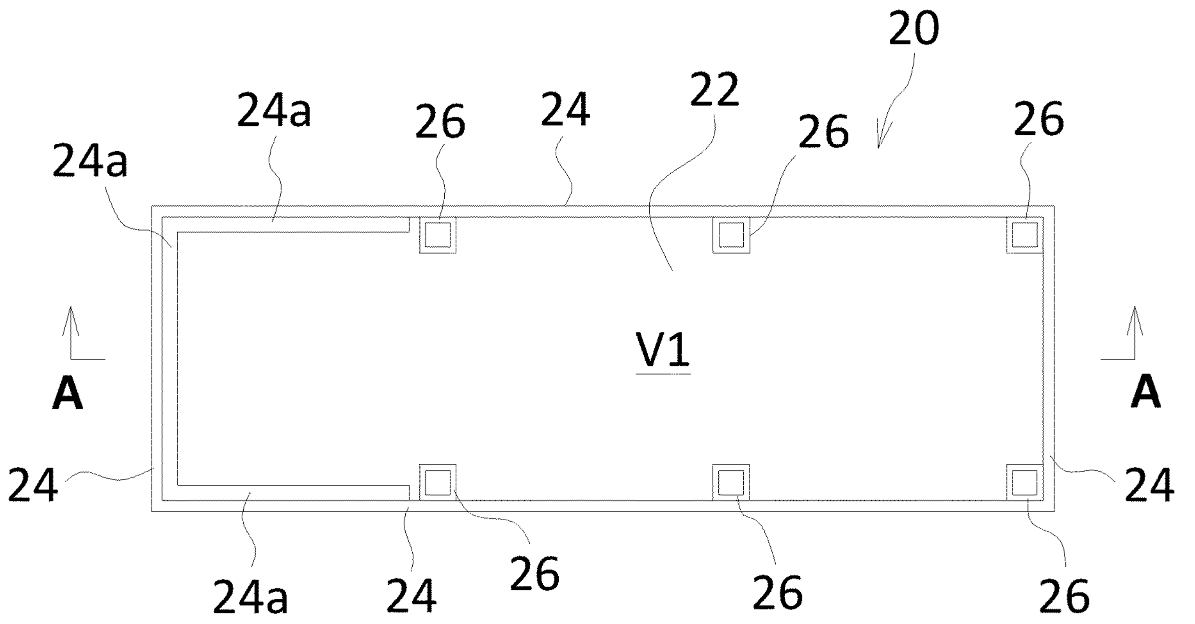
FIG. 9 is a top view of a lower tray included in the shoe sole cleaning device of FIG. 8.
Figure 10:
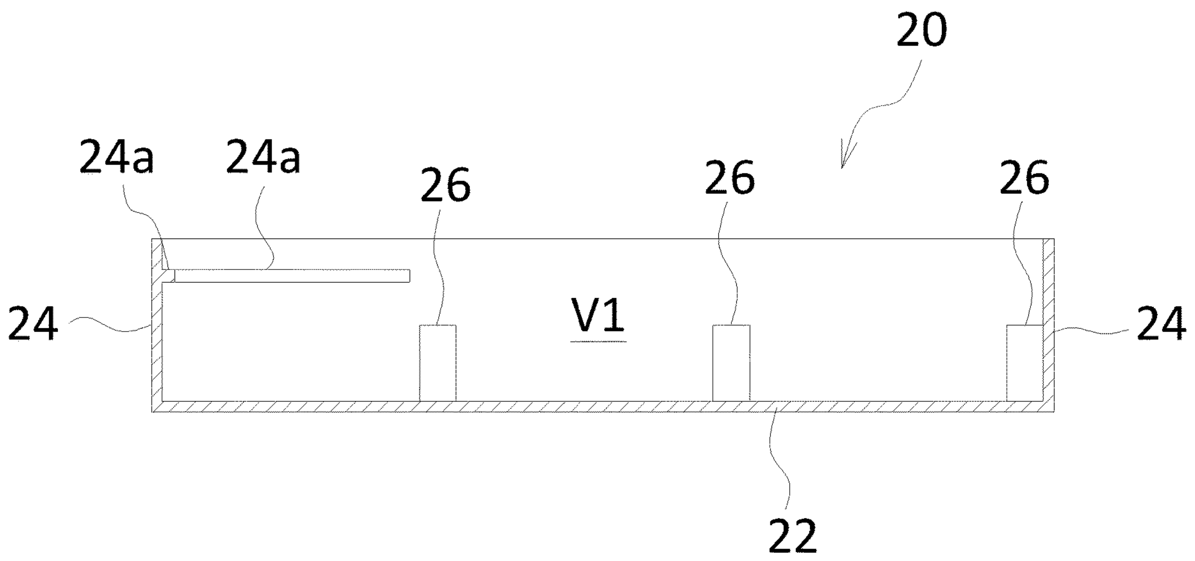
FIG. 10 is a cross sectional view of the lower tray taken along the line A-A of FIG. 9.

FIGS. 9 and 10 show details of the lower tray 20. The lower tray 20 has a bottom wall 22 and one or more upstanding side walls 24. In the illustrated example, the lower tray 20 has four side walls 24 arranged so as to form a rectangular cross-section, but may have only one side wall in the case of circular or elliptical cross-section, or may have three side walls in the case of triangular cross-section. The lower tray 20 may have five or more side walls 24. The bottom wall 22 and the one or more side walls 24 define a first compartment V1 thereinside. The first compartment V1 is configured to store cleaning liquid and also accommodate at least a part of, particularly the lower part of, the upper tray 30 (see FIG. 8). In use, the cleaning liquid, preferably water, more preferably water containing one or more additives such as an antifreeze to form antifreeze liquid or mild salt solution, is to be stored within the first compartment V1 to a level discussed later.

Figure 11:
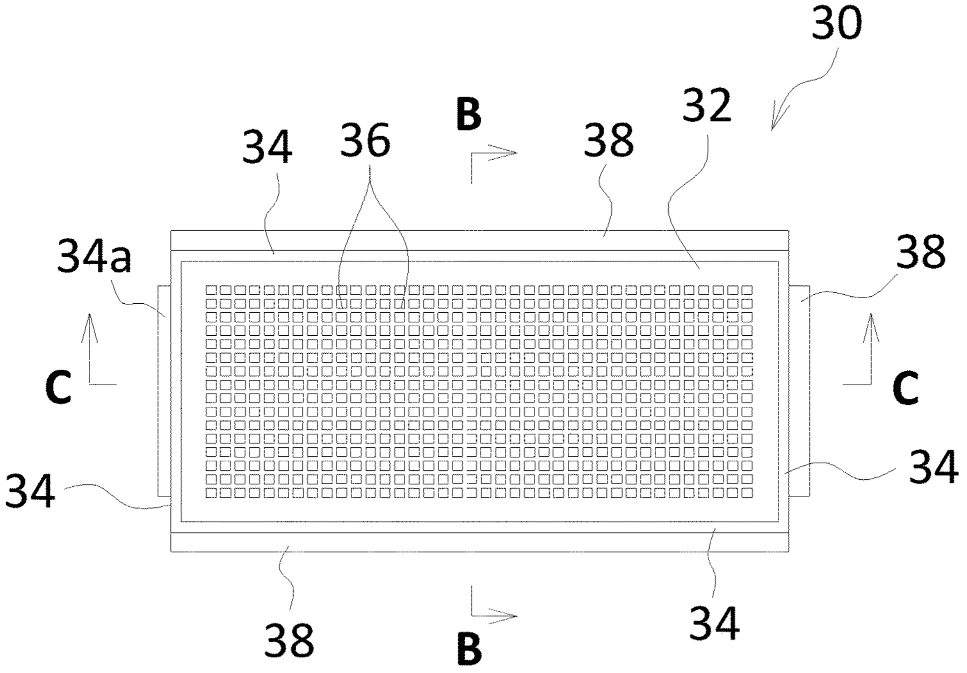
FIG. 11 is a top view of an upper tray included in the shoe sole cleaning device of FIG. 8.
Figure 12:
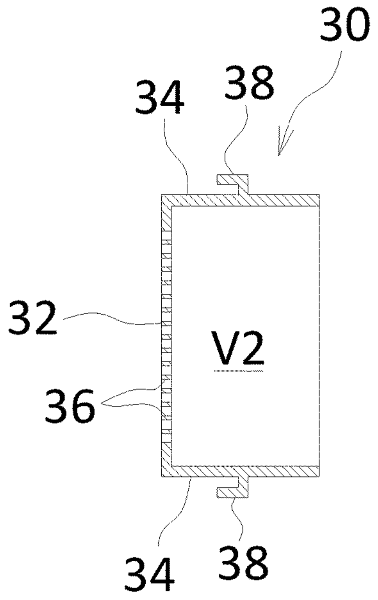
FIG. 12 is a cross sectional view of the upper tray taken along the line B-B of FIG. 11.
Figure 13:
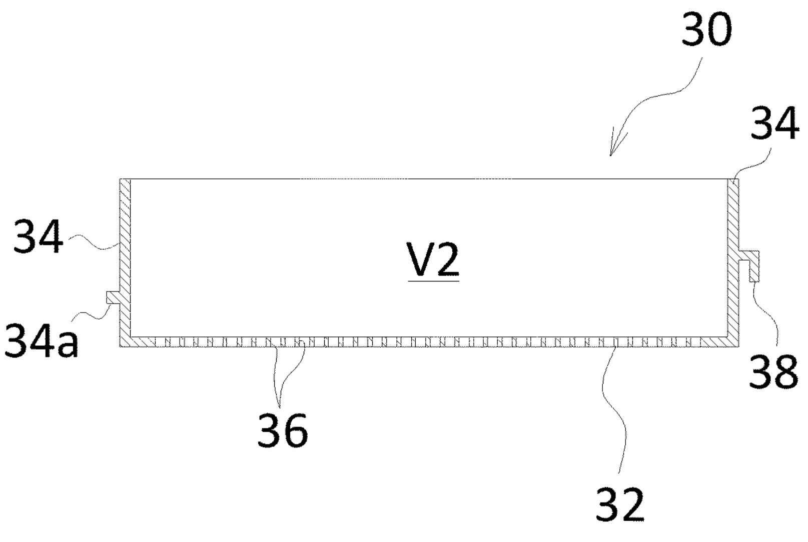
FIG. 13 is a cross sectional view of the upper tray taken along the line C-C of FIG. 11; and, FIG. 14 is a perspective view of a shoe sole cleaning kit, in use, in accordance with the present invention.

With reference to FIGS. 11 to 13, the upper tray 30 can be seen in detail. The upper tray 30 has a bottom wall 32 and one or more upstanding side walls 34. The bottom wall 32 and the one or more side walls 34 define a second compartment V2 for pebbles or crushed stone. In the illustrated example, the upper tray 30 has four side walls 34 arranged so as to form a rectangular cross-section, but may have only one side wall in the case of circular or elliptical cross-section, or may have three side walls in the case of triangular cross-section. The upper tray 30 may have five or more side walls 34. In any case, the upper tray 30 is shaped and dimensioned such that at least a part of, particularly at least a lower part of, the upper tray 30 is accommodated in the first compartment V1 of the lower tray 20 with the bottom wall 32 of the upper tray 30 facing the bottom wall 22 of the lower tray 20.

The upper tray 30 includes one or more holes 36 to communicate between the first compartment V1 and the second compartment V2, with the result that when the cleaning liquid is supplied in the first compartment V1, it enters the second compartment V2 through the one or more holes 36 of the upper tray 30. In the illustrated example, a large number of holes 36 with square shape are formed in the bottom wall 32. These holes 36 may be arranged in matrix. The shape, arrangement and number of the holes 36 are not limited to the illustrated example. For example, the hole 36 may have a circular shape, triangular shape, elongate shape, polygonal shape, or irregular shape. Additionally or alternatively, one or more holes 36 may be provided in the lower portion of the side wall 34.

Figure 14:
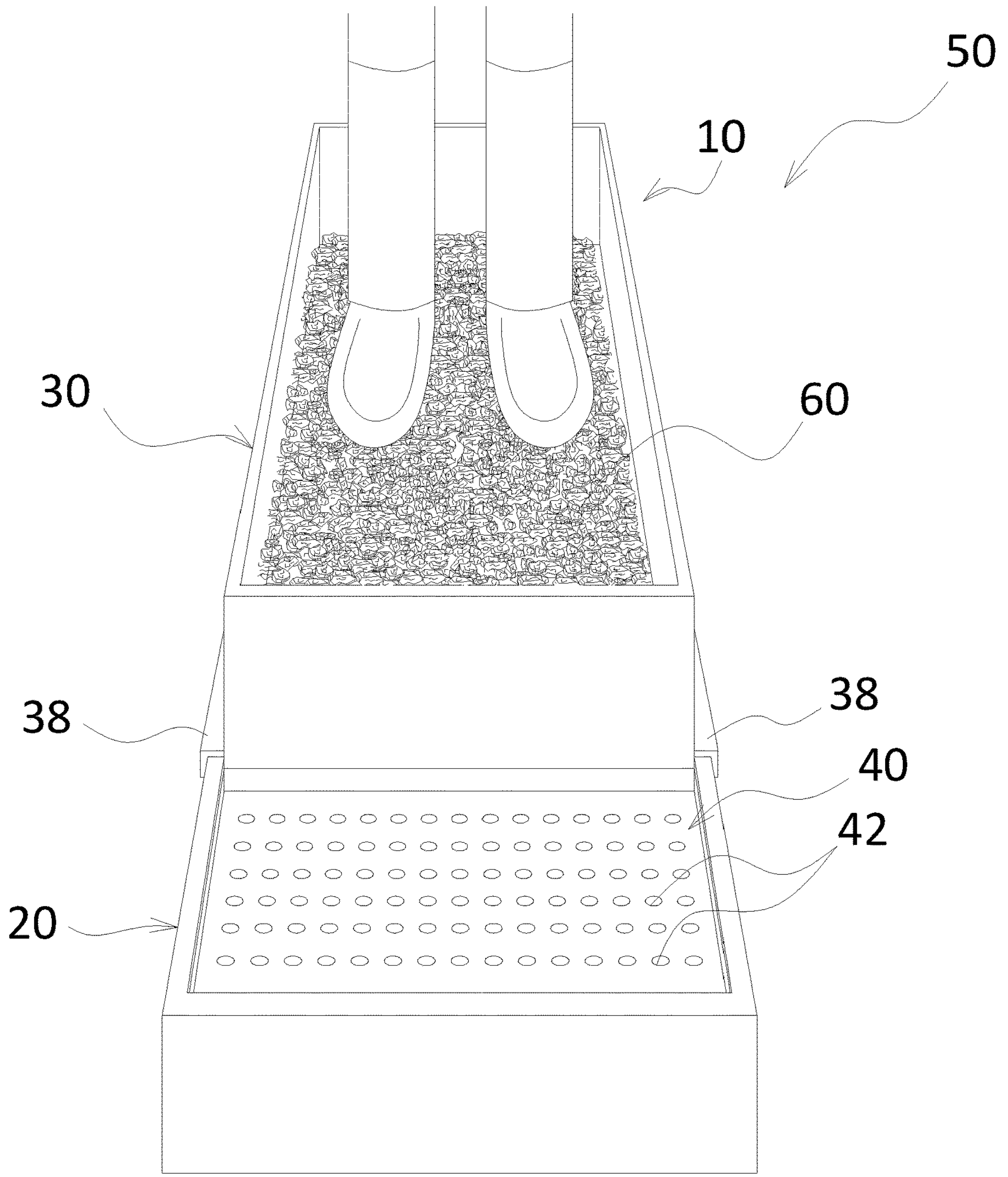

FIG. 14 shows a shoe sole cleaning kit 50, in use, in accordance with the present invention. The shoe sole cleaning kit 50 includes pebbles or crushed stone 60, as well as a shoe sole cleaning device in accordance with the present invention, preferably the shoe sole cleaning device 10 as discussed above with reference to FIGS. 8 to 13. The pebbles or crushed stone may be made of limestone or other hard stone such as granite etc or even recycled glass The limestone is less likely to break up during use than sandstone. Alternatively or additionally, pebbles or crushed stone made of igneous rock or metamorphic rock may be used. The maximum diameter or width of each pebble or crushed stone 60 is larger than the width of the hole 36 of the upper tray 30. The maximum diameter or width of each pebble or crushed stone 60 may be 5.0 cm or less, preferably 4.0 cm or less, more preferably 3.0 cm or less. See above classed as 20 mm In use of the device 10, such pebbles or crushed stone 60 is disposed in the second compartment V2 of the upper tray 30, preferably to the extent that the bottom wall 32 of the upper tray 30 is covered thereby. Preferably, the pebbles or crushed stone 60 is disposed to be generally flat. Before or after, or at the same time with the disposition of the pebbles or crushed stone 60, cleaning liquid such as water, preferably water containing one or more additives such as an antifreeze to form antifreeze liquid or mild salt solution, is provided in the first compartment V1 to a level above the bottom wall 32 of the upper tray 30, preferably to a level where the cleaning liquid at least partially soaks the pebbles or crushed stone 60 on the bottom wall 32.

When a user moves the shoe(s) back and forth on the pebbles or crushed stone 60, the shoe sole(s) comes into contact with the cleaning liquid, and at the same time the pebbles or crushed stone 60 scrapes the debris from the wet shoe sole(s).

The pebbles or crushed stone 60, by virtue of its ridgy and/or edgy shape, allows for effective scraping of debris from the shoe sole(s). Further, the cleaning liquid prevents the scraped debris from re-adhering onto the sole. Moreover, with the solidity of the pebbles or crushed stone 60, the effective removal of debris is ensured over a long period of time.

After cleaning the shoe sole(s), it may be wiped by a wiping mat (not shown) supported on the wiping mat tray 40. The wiping mat may be liquid absorbable and/or permeable mat. An exemplary wiping mat is a porous body made from polyvinyl alcohol. Preferably, liquid oozing or permeating from the mat returns to the first compartment V1. To this end, the wiping mat tray 40 may be arranged over a part of the first compartment V1 exposed from the upper tray 30 and include one or more holes 42 communicating with the first compartment V1.

The wiping mat tray 40 may be supported by one or more supporting ribs 24*a* each projecting from an inner surface of the side wall 24 of the lower tray 20 (see FIGS. 8 to 10).

The wiping mat tray 40 may be supported by one or more supporting ribs 34*a* each projecting from an outer surface of the side wall 34 of the upper tray 30 (see FIGS. 8, 11 and 13).

Now referring back to FIGS. 8 to 13, further preferable and advantageous features can be identified. The shoe sole cleaning device 10 may further include a supporting means for supporting the upper tray 30 with a distance from the lower tray 20. Such a supporting means allows for keeping the cleaning liquid around the pebbles or crushed stone 60 clean, because the scraped debris in the cleaning liquid precipitates by gravity toward the spaced area between the lower tray 20 and the upper tray 30, with the result that more improved cleanability of the shoe sole can be ensured.

As can be seen in FIGS. 8 to 10, the supporting means may include one or more columns 26 arranged between the bottom wall 22 of the lower tray 20 and the bottom wall 32 of the upper tray 30. The one or more columns 26 may be formed integrally with the lower tray 20, as shown in FIGS. 9 and 10. Alternatively, the one or more columns 26 may be formed integrally with the upper tray 30. In the illustrated example, six columns 26 are provided adjacent the side walls 24, but the number and location of the columns 26 are not limited thereto.

Additionally or alternatively, as can be seen in FIGS. 8, 11 and 12, the supporting means may include one or more hook flanges 38 which project outwardly from the side walls 34 of the upper tray 30. Each hook flange 38 can be detachably hooked to an upper edge of the side wall 24 of the lower tray 20 so that a predetermined space are provided between the bottom wall 22 of the lower tray 20 and the bottom wall 32 of the upper tray 30.

Without showing, further variants are possible. For example, the lower tray 20 may include two or more separated compartments V1 arranged in line and respectively storing cleaning liquid.

The lower tray 20 may include connection(s) for supply and/or drain pipe(s) for the cleaning liquid. The cleaning liquid may be supplied and drained at all times via the connections.

The invention claimed is:

1. A footwear cleaning device, comprising:

a lower tray having a bottom wall and one or more side walls which define a first compartment for cleaning liquid; and an upper tray having a bottom wall and one or more side walls which define a second compartment for cleaning aggregate;

a cleaning aggregate held in the upper tray;

wherein the upper tray is shaped and dimensioned such that at least a part thereof is accommodated in the first compartment of the lower tray, and wherein the upper tray includes one or more holes that communicate between the first and second compartments; and wherein when a cleaning liquid is held in the lower tray the cleaning liquid enters the second compartment through the one or more holes of the upper tray while the upper tray retains the cleaning aggregate.

2. The footwear cleaning device of claim 1, further comprising a third compartment for containing cleaning fluid, wherein the first and third fluid compartments are in fluid communication.

3. The footwear cleaning device of claim 2, wherein the third compartment is positioned within the lower tray.

4. The footwear cleaning device of claim 2, wherein a divider separates the first and third compartments such that fluid flows from the third compartment to the first compartment when water in the third compartment exceeds the depth of the divider, such that the third department is kept substantially free from detritus contained in the first compartment by said divider.

5. The footwear cleaning device of claim 1, further comprising a fluid inlet, optionally wherein the fluid inlet feeds fluid into the third compartment.

6. The footwear cleaning device of claim 1, further comprising a fluid outlet to output fluid from the first compartment when the level of fluid within the first compartment is raised above the level of the fluid output.

7. The footwear cleaning device according to claim 1, wherein the one or more holes are formed in the bottom wall of the upper tray.

8. The footwear cleaning device according to claim 1, wherein the one or more holes are arranged in matrix.

9. The footwear cleaning device according to claim 1, further comprising a supporting means for supporting the upper tray.

10. The footwear cleaning device according to claim 9, wherein the supporting means includes one or more hook flanges which project outwardly from the one or more side walls of the upper tray so as to be hooked to upper edges of the one or more side walls of the lower tray.

11. The footwear cleaning device according to claim 9, wherein the supporting means includes one or more columns arranged between the bottom wall of the upper tray and the bottom wall of the lower tray.

12. The footwear cleaning device according to claim 9, wherein the supporting means comprises a ledge positioned in the lower tray.

13. The footwear cleaning device according to claim 12, wherein the ledge is formed integrally with the lower tray.

14. The footwear cleaning device according to claim 1, further comprising a wiping mat tray for receiving a wiping mat thereon.

15. The footwear cleaning device according to claim 14, wherein the wiping mat tray is supported by one or more supporting ribs which project from inner surfaces of the one or more side walls of the lower tray, optionally wherein the wiping mat tray is further supported by one or more supporting ribs which project from outer surfaces of the one or more side walls of the upper tray.

16. The footwear cleaning device according to claim 14, the wiping mat tray including one or more holes communicating with the first compartment.

17. The footwear cleaning device according to claim 1, wherein the side walls of the lower tray form a rectangular cross-section.

18. The footwear cleaning device according to claim 17, wherein the side walls of the upper tray form a rectangular cross-section.

19. The footwear cleaning device of claim 1, further comprising a lid element;

wherein the lid element is configured to be removably coupled to the upper tray;

wherein the lid element and the coupling between the lid element and the upper tray are configured to be substantially impermeable to fluid.

20. The footwear cleaning device according to claim 1, wherein the cleaning aggregate comprises pebbles or crushed stone.

21. The footwear cleaning device according to claim 20, wherein the maximum diameter or width of the pebbles or crushed stone is 5.0 cm or less, preferably 4.0 cm or less, more preferably 3.0 cm or less.

22. The footwear cleaning device according to claim 21, wherein the maximum diameter or width of the pebbles or crushed stone is 20 mm.

23. The footwear cleaning device according to claim 20, wherein the pebbles or crushed stone is made of limestone, other hard stone, granite or recycled material.

24. The footwear cleaning device according to claim 23, wherein the recycled material is glass.

25. A method of installing a footwear cleaning device, comprising:

a lower tray having a bottom wall and one or more side walls which define a first compartment for cleaning liquid; and an upper tray having a bottom wall and one or more side walls which define a second compartment for cleaning aggregate;

wherein the upper tray is shaped and dimensioned such that at least a part thereof is accommodated in the first compartment of the lower tray, and wherein the upper tray includes one or more holes that communicate between the first and second compartments, the method comprising:

digging a trench with the approximate dimensions of the footwear cleaning device;

positioning the footwear cleaning device within the trench such that an upper surface of the footwear cleaning device is approximately flush with ground level;

filling the first compartment with cleaning fluid;

filling the second compartment with cleaning aggregate.

* * * * *